United States Patent [19]

Arima

[11] Patent Number: 5,410,890
[45] Date of Patent: May 2, 1995

[54] CONTROL APPARATUS OF AIR-CONDITIONER

[75] Inventor: Takafumi Arima, Kawasaki, Japan

[73] Assignee: Fujitsu General Limited, Japan

[21] Appl. No.: 188,071

[22] Filed: Jan. 27, 1994

[51] Int. Cl.⁶ .......................... F25B 1/00; G05B 13/02
[52] U.S. Cl. .................. 62/228.4; 236/78 D; 364/163; 395/61
[58] Field of Search .............. 62/228.4, 229; 236/78 D; 395/61; 364/163

[56] References Cited

U.S. PATENT DOCUMENTS 5,156,013 10/1992 Arima et al. ............... 236/78 D

FOREIGN PATENT DOCUMENTS 4015445 1/1992 Japan .................. 236/78 D
4032646 2/1992 Japan .................. 236/78 D

*Primary Examiner*—William E. Wayner
*Attorney, Agent, or Firm*—Adams & Wilks

[57] ABSTRACT

In a control apparatus of an air-conditioner in which a temperature difference between the room temperature and the set temperature is set into an input 1, a time-dependent change in the room temperature is set to an input 2, fuzzy arithmetic operations are executed in accordance with control rules by using membership functions of a membership function section 1, a switching amount of an operating frequency of a compressor 2 of an output is controlled on the basis of the results of the fuzzy arithmetic operations, and the operating frequency is switched at every predetermined interval (t seconds) thereby executing a room temperature control, during the operation, a room temperature (Tr) is always detected by a room temperature detecting section 4 and a change amount (Tr2-Tr1) of the room temperature is calculated in a room temperature change amount calculating section 5 each time of the detection, and when the calculated change amount exceeds a predetermined value, it is determined that the room temperature suddenly fluctuated, so that the fuzzy arithmetic operations are immediately executed and the operating frequency of the compressor 2 is switched.

1 Claim, 6 Drawing Sheets

CONTROL APPARATUS OF AIR-CONDITIONER

FIELD OF THE INVENTION

The invention relates to a control apparatus of an air-conditioner using a fuzzy control in a room temperature control in an air-conditioner of the inverter type.

DESCRIPTION OF THE RELATED BACKGROUND ART

Hitherto, such a kind of air-conditioner controls a room temperature by a fuzzy control as shown in FIG. 4. For example, the air-conditioner comprises: a fuzzy control memory section 1 having control rules, for example, as shown in the following mathematical expressions 1(a) to 1(f) and membership functions shown in FIGS. 5 to 7; and a control apparatus 3 for controlling a switching amount of an operating frequency of a compressor 2 in accordance with the results of the fuzzy arithmetic operations using the above control rules and membership functions. A temperature difference between a room temperature (Tr) and a set temperature (Ts) is set to an input 1, a change amount of the room temperature is set to an input 2, and a degree at which the inputs 1 and 2 satisfy the control rule is calculated with reference to membership functions (A) (fuzzy arithmetic operations are executed).

Mathematical expressions 1

(a) if E = NB and D = NB then F = PB
(b) if E = NB and D = PB then F = ZR
(c) if E = ZR and D = NB then F = PB
(d) if E = ZR and D = ZR then F = ZR
(e) if E = PB and D = PB then F = NB
(f) if E = PB and D = NB then F = ZR where,
E: temperature difference between the room temperature (Tr) and the set temperature (Ts)
D: time-dependent change ((Tr1−Tr2)/min)
F: switching amount of the operating frequency of the compressor In the above mathematical expressions 1(a) to 1(f), the input variable E of the antecedent part of the control rule is set to (Tr−Ts), the input variable D is set to a change amount of the room temperature (for example, (Tr1−Tr2)/min), the output variable F of the consequent part is set to a change amount off the operating frequency off the compressor, D denotes a change amount of the room temperature, E indicates a temperature difference (Tr−Ts), and F shows a switching amount of the operating frequency of the compressor. In the above mathematical expressions and a diagrams of the membership functions (A) shown in FIGS. 8 and 9, a value of NB largely changes toward the negative direction, a value of ZR is equal to 0 (no change), and a value of PB largely changes toward the positive direction.

The control rules of the above mathematical expressions and the membership functions shown in FIGS. 5 to 7 are determined as shown in intermediate characteristics for both of the stability of the room temperature and the response speed to a rapid change in the room due to a disturbance (opening or closure of the door or window). The control apparatus 3 controls a fan in the room, an outdoor fan, and the like on the basis of the room temperature, set temperature, and the like.

The above fuzzy arithmetic operations are executed at every predetermined interval (t seconds) during the operation of the air-conditioner. The switching amount of the operating frequency of the compressor 2 is controlled on the basis of the results of the fuzzy arithmetic operations. The above predetermined interval (t seconds) has been preset to an optimum value on the basis of the results of experiments according to the actual state of the air-conditioner. For example, the above predetermined interval is set to a value which is not too long or too short.

That is, this is because as: shown in. FIG. 8 when the predetermined interval is set to a long value $t_1$ ($>t$), the switching speed of the operating frequency of the compressor 2 for a fluctuation of the room temperature (Tr) is slow and the stability of the room temperature remarkably deteriorates and comfortableness is eventually deteriorated. On the contrary, this is because as shown in FIG. 9, when the predetermined interval is set to a short value $t_2$ ($<t$), the switching speed of the operating frequency of the compressor 2 for the fluctuation of the room temperature ($T_r$) is fast and the stability of the room temperature is very good, but since the operating frequency is frequently switched, in the case where the operation is continued for a long time, an electric power consumption of the air-conditioner is large and the operating efficiency eventually deteriorates.

At present, the predetermined interval (t seconds) is set to an intermediate value between the above values $t_1$ and $t_2$.

In the above control apparatus of the air-conditioner, however, in the case where the room temperature (Tr) rapidly changes by a disturbance or the like as shown in FIG. 10, for example, in the case where the window is temporarily opened during the warming operation and the room temperature suddenly drops (the case where the room temperature drops from A time point to B time point in FIG. 10), the operating frequency of the compressor 2 is switched only at every predetermined interval (t seconds) mentioned above. Therefore, a response speed is slow, namely, a leading speed of the room temperature is slow, it takes a time until the room temperature is returned to a comfortable value, and the comfortableness is consequently lost.

SUMMARY OF THE INVENTION

It is an object of the invention to provide a control apparatus of an air-conditioner in which a good response speed is obtained for a disturbance or the like, a temperature can be promptly returned to the room temperature, and a loss of comfortableness can be prevented.

To accomplish the above object, according to the invention, there is provided a control apparatus of an air-conditioner, wherein when an indoor fan, an outdoor fan, and a compressor constructing a refrigerating cycle are controlled on the basis of at least an indoor temperature and a set temperature and a cool wind or a hot wind are blown out into the room and the temperature in the room is controlled, a temperature difference between the indoor temperature in the detection room and the set temperature is set to an input 1, a change amount of the indoor temperature is set to an input 2, fuzzy arithmetic operations are executed by using preset control rules and membership functions on the basis of the inputs 1 and 2, and a switching amount of an operating frequency of the compressor is controlled at every predetermined interval on the basis of the results of the fuzzy arithmetic operations. During the operation of the air-conditioner, the indoor temperature is detected and the change amount of the indoor temperature is calculated, and when the calculated change amount exceeds a predetermined value, the switching amount of the operating frequency of the compressor is controlled.

By the above apparatus, when the air-conditioner is operated (at the time of control of the room temperature by the fuzzy control), a room temperature (Tr) is always detected and a change amount (Tr2−Tr1) of the room temperature is calculated every time of such a detection. When the calculated change amount exceeds a predetermined value, it is determined that the room temperature has suddenly been fluctuated, and the switching amount of the operating frequency of the compressor is immediately calculated before reaching the time of the predetermined interval. The operating frequency of the compressor is switched on the basis of the calculated switching amount. Consequently, the room temperature is rapidly returned to the set temperature or a temperature near the set temperature, so that the temperature is promptly returned to the room temperature.

Therefore, even when the room temperature suddenly changes by the disturbance such as opening or closing of a window or a door or the like, the room temperature can be soon returned to the set temperature (or a temperature near the set temperature). The returning performance of the room temperature after completion of the disturbance is improved and the comfortableness can be improved.

DESCRIPTION OF THE PREFERRED EMBODIMENT

Figure 2:
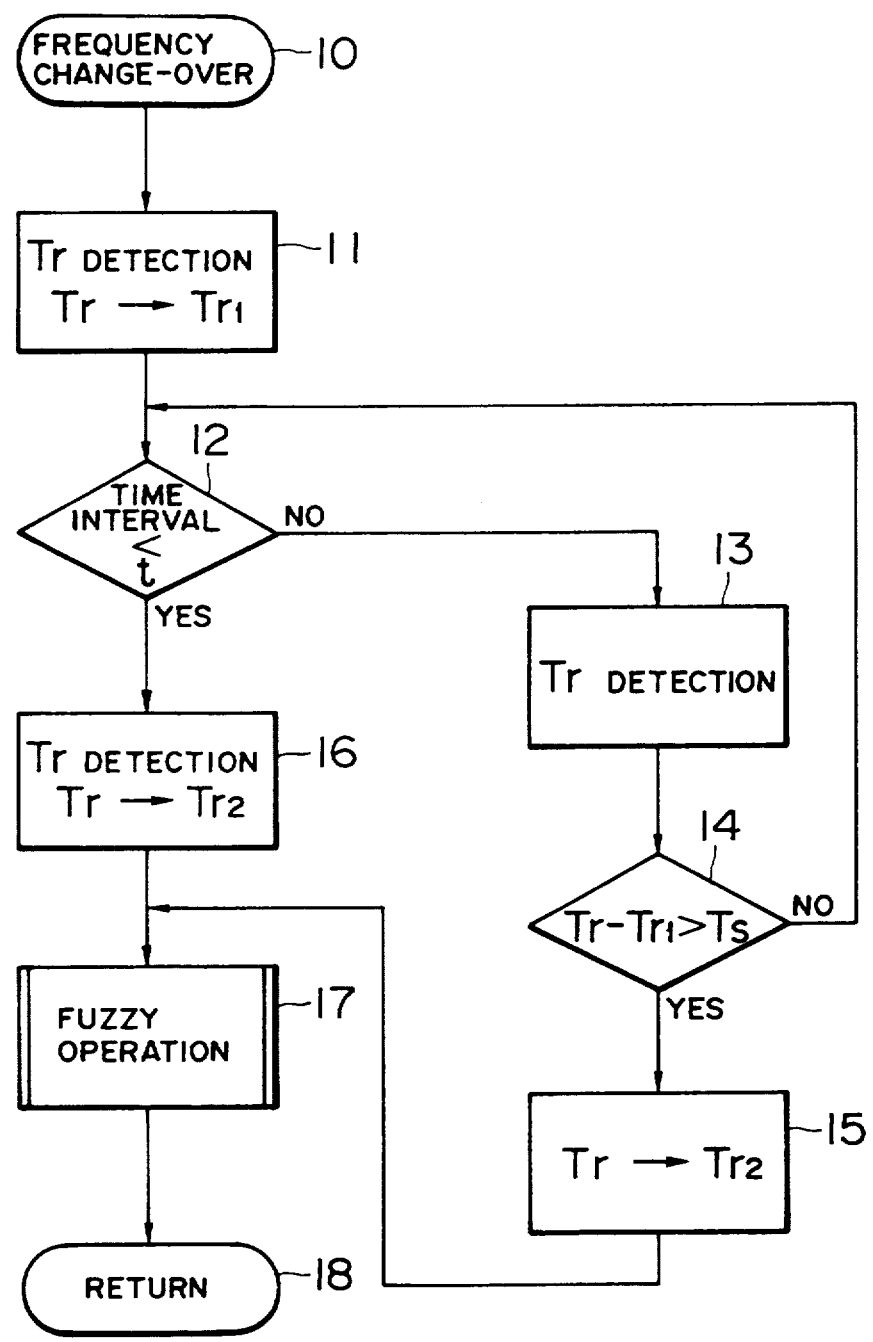
FIG. 2 is a flowchart for describing the control of the air-conditioner shown in FIG. 1.

According to a control apparatus of an air-conditioner of the invention, fuzzy arithmetic operations are executed on the basis or an input 1 (temperature difference between the room temperature and a set temperature) and an input 2 (time-dependent change in room temperature), a switching amount of an operating frequency of a compressor of an output is controlled, and the operating frequency is switched at every predetermined interval (t seconds), thereby executing a zoom temperature control. During the operation, a room temperature (Tr) is always detected and a change amount (Tr2−Tr1) of the room temperature is calculated every time of such a detection. A calculating method of Tr2−Tr1 and a control apparatus of the switching amount of the operating frequency will now be described with reference to a flowchart of FIG. 2. In step 10, the operating frequency is switched at every predetermined interval (t seconds). In step 11, Tr upon operation of the air-conditioner is detected and is set to Tr1. In step 12, when a detection time of Tr is less than the predetermined interval, the next Tr is detected in step 13. When Tr−Tr1>Ts in step 14, Tr is set to Tr2 in step 15. If NO, the processing routine is returned to step 11. In step 17, fuzzy arithmetic operations are executed. In step 18, the processing routine is returned to step 10. In step 12, the predetermined interval is measured by a timer. When the interval is reduced, Tr is detected in step 16 and is set to Tr2. Fuzzy arithmetic operations are executed in step 17. When the calculated change amount exceeds a predetermined value as mentioned above, it is determined that the room temperature suddenly fluctuated, so that the operating frequency of the compressor is immediately switched. In the above fuzzy control, the control rules shown in the above mathematical expressions 1(a) to 1(f) and the membership functions shown in FIGS. 5 to 7 are used.

Figure 1:
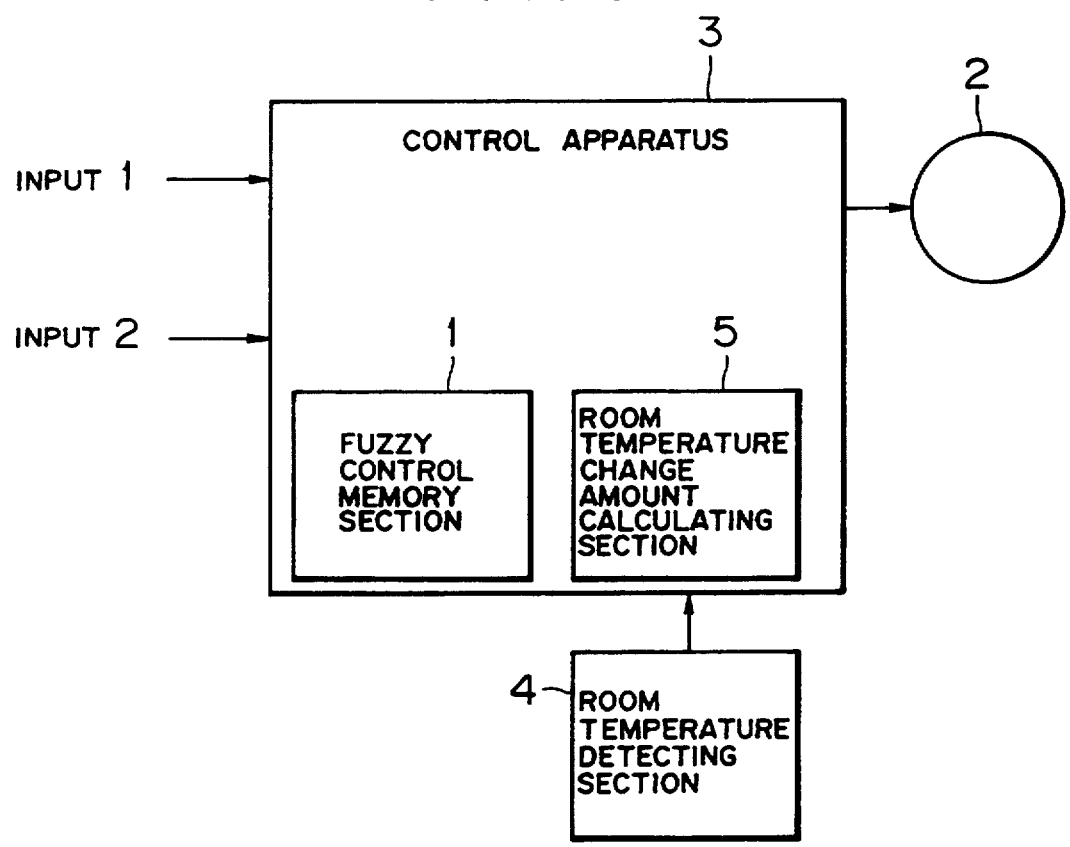
FIG. 1 shows an embodiment of the invention and is a schematic block diagram of a control apparatus of an air-conditioner.
Figure 4:
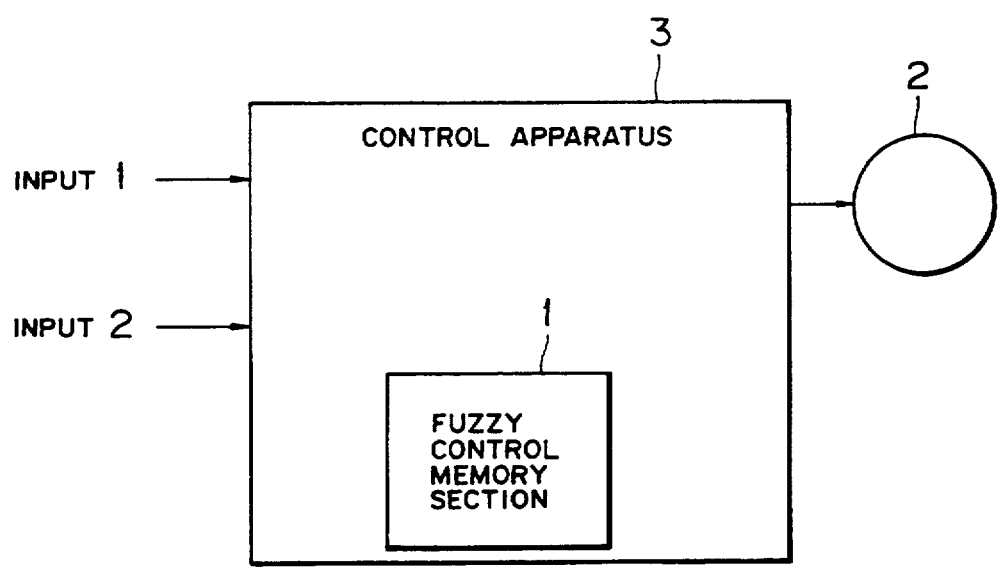
FIG. 4 is a schematic block diagram of a conventional control apparatus of an air-conditioner.

Therefore, as shown in FIG. 1, the control apparatus 3 of the air-conditioner of the invention has a room temperature change amount calculating section 5 which receives a room temperature detection signal from a room temperature detecting section 4 and calculates a change amount (Tr2−Tr1) of the room temperature. In the diagram, the same and corresponding portions as those in FIG. 4 are designated by the same reference numerals and their overlapped descriptions are omitted here. The calculation of the change amount in the room temperature change amount calculating section 5 is executed at every time that is shorter than the above predetermined interval (t seconds).

The control apparatus of the air-conditioner with the above construction will now be described in detail with reference to a graph of FIG. 3. First, it is now assumed that the indoor fan, outdoor fan, compressor 2, and the like are controlled on the basis of the warming operation of the air-conditioner, for example, the set temperature which is set by a remote controller, the room temperature, or the like.

Figure 5:
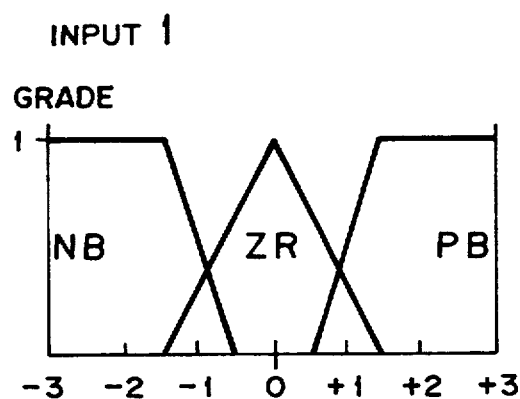
FIG. 5 is a schematic diagram of membership functions which are used in the control apparatuses shown in FIGS. 1 and 4.
Figure 6:
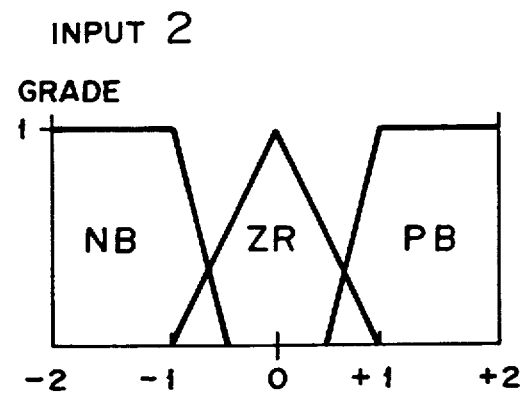
FIG. 6 is a schematic diagram of membership functions which are used in the control apparatuses shown in FIGS. 1 and 4.
Figure 7:
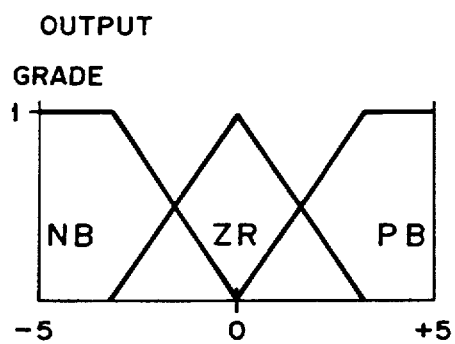
FIG. 7 is a schematic diagram of membership functions which are used in the control apparatuses shown in FIGS. 1 and 4.
Figure 8:
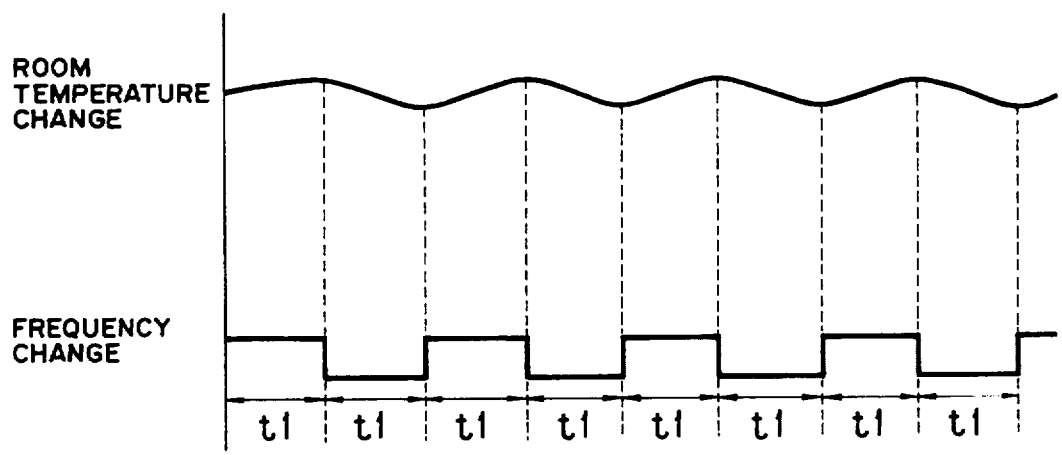
FIG. 8 is a schematic graph for explaining the operation of the control apparatus of the air-conditioner shown in FIG. 4.
Figure 9:
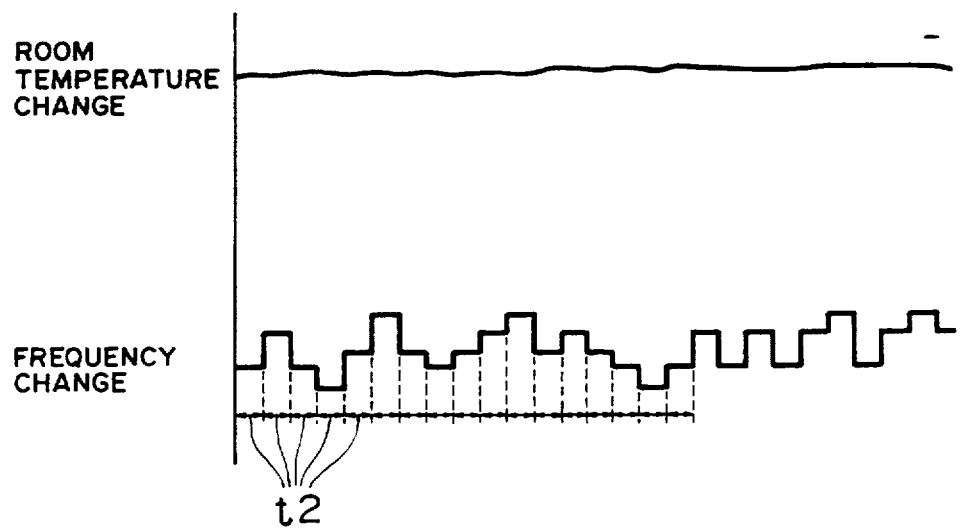
FIG. 9 is a schematic graph for explaining the operation of the control apparatus of the air-conditioner shown in FIG. 4.
Figure 10:
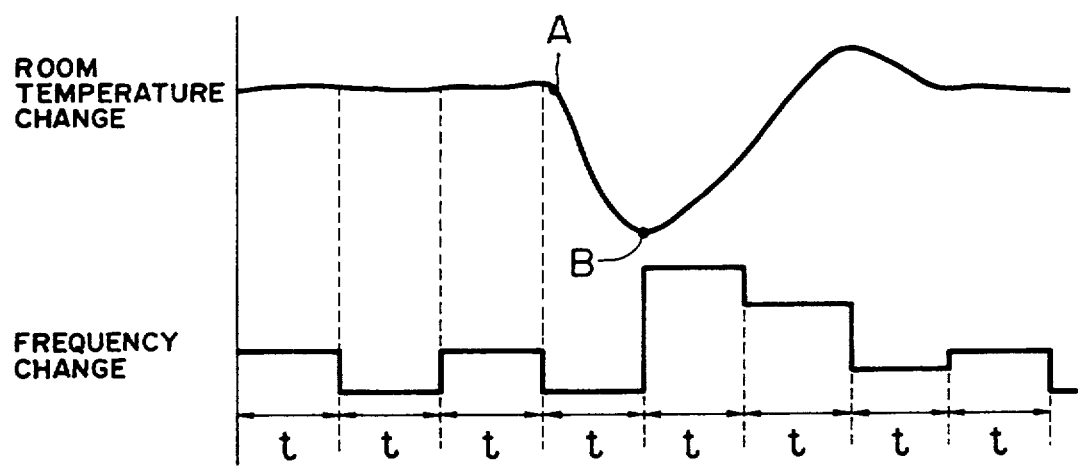
FIG. 10 is a schematic graphic for explaining the operation of the control apparatus of the air-conditioner shown in FIG. 4.

In the above control apparatus 3, the fuzzy arithmetic operations are executed in accordance with the control rules shown in the mathematical expressions by using the membership functions shown in FIGS. 5 to 7. On the basis of the fuzzy arithmetic operation results, the room temperature control is performed. In this case, in a manner similar to the conventional method, the above fuzzy arithmetic operations are executed at every predetermined interval (t seconds). On the basis of the results of the arithmetic operations, the switching amount of the operating frequency of the compressor 2 is controlled.

During the operation of the air-conditioner, namely, upon room temperature control, the change amount (Tr2−Tr1) of the room temperature is calculated in the room temperature change amount calculating section 5 of the control apparatus 3. A check is made to see if the calculated change amount exceeds a predetermined value or not. Such a predetermined value, is determined on the assumption that the room temperature suddenly changes by a disturbance such as opening or closure of the window or door or the like.

Figure 3:
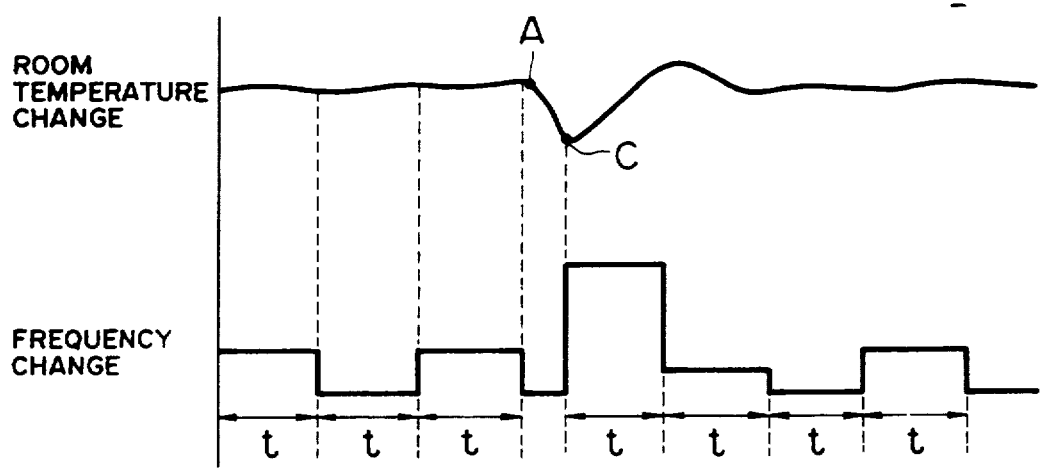
FIG. 3 is a schematic graph for explaining the operation of the control apparatus of the air-conditioner shown in FIG. 1.

Now, assuming that the window is opened and the outside air flows into the room at a time point A shown by an arrow in FIG. 3, the room temperature drops to a point C shown by an arrow. The C point indicates a point at which the value of (Tr−Tr1) exceeds a predetermined value before the elapse of time t. In this instance, when the calculated change amount by the room temperature change amount calculating section 5 exceeds a predetermined value, it is determined that the fluctuation of the room temperature suddenly dropped, so that the operating frequency of the compressor 2 is immediately switched without waiting for the elapse of the above predetermined interval (t seconds). Namely, the fuzzy arithmetic operations are executed and the switching amount of the operating frequency of the compressor 2 is controlled. Therefore, as shown by a solid line in FIG. 3, the room temperature rapidly rises and reaches the set temperature.

When the room temperature is returned to the original state and the change amount of the room temperature is equal to or less than the predetermined value, the room temperature control is executed in the ordinary manner. That is, the operating frequency of the compressor 2 is switched at every predetermined time (t seconds).

As mentioned above, when the switching amount of the operating frequency of the compressor 2 is fuzzy controlled at every predetermined interval (t seconds), the room temperature is always detected and the change amount (Tr2−Tr1) of the room temperature is calculated at every time that is shorter than t seconds. When the calculated change amount exceeds the predetermined value, it is decided that the room temperature suddenly changed, so that the operating frequency of the compressor 2 is switched. Therefore, the room temperature can be rapidly returned to the set temperature (or a temperature near the set temperature) and the returning performance of the room temperature can be improved, so that the deterioration of the indoor environment can be suppressed and the comfortableness can be improved.

What is claimed is:

1. In a control apparatus of an air-conditioner in which when an indoor fan, an outdoor fan, and a compressor constructing a refrigerating cycle are controlled on the basis of at least an indoor temperature and a set temperature and a cool wind or a hot wind is blown out into the room and a temperature in the room is controlled, a temperature difference between the detected indoor temperature and the set temperature is set to an input 1, a change amount of the indoor temperature is set to an input 2, fuzzy arithmetic operations are executed by using preset control rules and membership functions on the basis of said inputs 1 and 2, and a switching amount of an operating frequency of said compressor is controlled at every predetermined interval on the basis of the results of said fuzzy arithmetic operations, the improvement in which during the operation of the air-conditioner, the temperature in the room is detected and the change amount of said indoor temperature is calculated, and when the calculated change amount exceeds a predetermined value, the switching amount of the operating frequency of the compressor is controlled.

* * * * *